United States Patent
Van der Sluijs et al.

(10) Patent No.: US 9,885,573 B2
(45) Date of Patent: Feb. 6, 2018

(54) METHOD, DEVICE AND COMPUTER PROGRAMME FOR EXTRACTING INFORMATION ABOUT ONE OR MORE SPATIAL OBJECTS

(71) Applicant: Otto Ooms B.V., Bergambacht (NL)

(72) Inventors: Alexander Petrus Hendricus Franciscus Van der Sluijs, Zoetermeer (NL); Jan Otto Ooms, Capelle aan den IJssel (NL)

(73) Assignee: Otto Ooms B.V., Bergambacht (NL)

( * ) Notice: Subject to any disclaimer, the term of this patent is extended or adjusted under 35 U.S.C. 154(b) by 287 days.

(21) Appl. No.: 14/384,359

(22) PCT Filed: Mar. 14, 2013

(86) PCT No.: PCT/NL2013/050173
§ 371 (c)(1),
(2) Date: Sep. 10, 2014

(87) PCT Pub. No.: WO2013/137733
PCT Pub. Date: Sep. 19, 2013

(65) Prior Publication Data
US 2015/0049187 A1   Feb. 19, 2015

(30) Foreign Application Priority Data
Mar. 15, 2012   (NL) ........................... 2008490

(51) Int. Cl.
*G01C 11/06* (2006.01)
*B66B 9/08* (2006.01)
(Continued)

(52) U.S. Cl.
CPC ............... *G01C 11/06* (2013.01); *B66B 9/08* (2013.01); *B66B 19/00* (2013.01); *G06T 7/579* (2017.01);
(Continued)

(58) Field of Classification Search
CPC ........... B66B 19/00; B66B 9/08; G01C 11/06; G06T 7/0044; G06T 7/0071; G06T 7/602;
(Continued)

(56) References Cited

U.S. PATENT DOCUMENTS 9,449,023 B2 *   9/2016   Ol ..................... G06F 17/30241
2002/0158873 A1 * 10/2002   Williamson ............ G06T 7/002
                                                         345/427
(Continued)

FOREIGN PATENT DOCUMENTS

DE     102008002241    12/2009
WO    WO-2010142929   12/2010

OTHER PUBLICATIONS

Davison, Andrew, "MonoSLAM: Real-Time Single Camera SLAM," IEEE Transactions on Pattern Analysis and Machine Intelligence, Jun. 2007, p. 1052-1067, vol. 29, No. 6.

*Primary Examiner* — Christopher S Kelley
*Assistant Examiner* — Maria Vazquez Colon
(74) *Attorney, Agent, or Firm* — Marcus C. Dawes; Daniel L. Dawes

(57) ABSTRACT

A computer program for the extraction of information about one or more spatial objects by a person, which program is designed for analyzing the sequence of images in real time, using image analysis techniques, and extracting information about said one or more objects, and communicating at least part of said information to the person in real time via the output means; wherein the information about said one or more objects comprises at least: the spatial position of said one or more objects; the spatial distance between two objects; the spatial relative angle between two essentially linear objects; and/or an indication regarding the realized accuracy of the extracted information.

11 Claims, 3 Drawing Sheets

(51) Int. Cl.
*B66B 19/00* (2006.01)
*G06T 7/73* (2017.01)
*G06T 7/579* (2017.01)
*G06T 7/62* (2017.01)

(52) U.S. Cl.
CPC .................. *G06T 7/62* (2017.01); *G06T 7/74* (2017.01); *G06T 2207/10016* (2013.01); *G06T 2207/30196* (2013.01); *G06T 2207/30204* (2013.01); *G06T 2207/30244* (2013.01)

(58) Field of Classification Search
CPC . G06T 2207/10016; G06T 2207/30196; G06T 2207/30204; G06T 2207/30244; G06T 7/579; G06T 7/62; G06T 7/74
See application file for complete search history.

(56) References Cited

U.S. PATENT DOCUMENTS

| | | | |
|---|---|---|---|
| 2008/0035430 A1* | 2/2008 | Van Der Heiden | B66B 9/08 187/201 |
| 2010/0045701 A1* | 2/2010 | Scott | G01S 5/163 345/633 |
| 2010/0214284 A1* | 8/2010 | Rieffel | G06T 17/00 345/419 |
| 2010/0314201 A1* | 12/2010 | Stannah | B66B 9/08 187/201 |
| 2012/0075343 A1* | 3/2012 | Chen | G09G 5/397 345/633 |
| 2012/0147152 A1* | 6/2012 | Vogiatis | G06T 7/0065 348/50 |
| 2012/0296463 A1* | 11/2012 | Rivers | B23Q 9/0042 700/114 |

* cited by examiner

METHOD, DEVICE AND COMPUTER PROGRAMME FOR EXTRACTING INFORMATION ABOUT ONE OR MORE SPATIAL OBJECTS

The present invention relates to a method for the extraction of information about one or more spatial objects by a person, wherein use is made of a device comprising a central processing unit which is loaded with a computer programme, a digital memory which is connected to the central processing unit, a camera which is capable of recording a sequence of images, and output means which are connected to the central processing unit. The invention further relates to the device that can be used in such a method.

The prior art regarding the measuring of staircases for assembling a stair lift comprises, inter alia, the so-called photogrammetry technology, wherein a multitude of photos of the staircase and the vicinity thereof are taken, which are used for making a 3-D model of the staircase and the vicinity thereof, and wherein subsequently a stair lift guide is virtually provided on the staircase and the dimensions of the various parts of the guide are determined by means of a CAD programme.

A drawback of this method is that taking the photographs and subsequently processing the information on the computer takes a relatively great deal of time and that the person taking the photographs of the staircase does not know whether enough photos have been taken and whether they have been taken correctly (as regards exposure and recording angle) and with sufficient overlap for making a sufficiently accurate 3-D model of the staircase and determining the dimensions of the parts with sufficient precision. It frequently happens, therefore, that the measurement must be carried out anew. Furthermore, the multitude of photographs take up a great deal of memory capacity, and sending them by electronic means takes a great deal of time.

The object of the invention is to provide a quick and reliable method of obtaining information about objects, in particular of obtaining geometric information about objects, more in particular of measuring objects, even more in particular of obtaining geometric information about a staircase and the vicinity of the staircase for use in the design of a guide of a stair lift.

According to a first aspect of the invention, the computer programme is to that end designed for analysing the sequence of images in real time, using image analysis techniques, and extracting information about said one or more objects, and communicating at least part of said information to the person in real time via the output means. According to another aspect of the invention, the information about said one or more objects comprises at least: the spatial position of said one or more objects; the spatial distance between two objects; the spatial relative angle between two essentially linear objects; and/or an indication regarding the realised (statistical) accuracy of the extracted information.

Preferably, markers are placed on or near said one or more objects before a sequence of images is recorded by means of the device, which markers have a shape such that they can take up a detectable spatial orientation in the images, the computer programme being designed to determine the spatial position and orientation of the markers on the basis of the markers detected in the images and/or of prominent elements ("salient features" or "natural features") detected in the images, and to use the information of the thus determined position and orientation of the markers during the recording of each of the images upon extracting the aforesaid information about said one or more objects. As a result, a set of clearly recognisable points is measured, so that the position of the camera can be determined with a high degree of precision. Preferably, the markers each have their own unique, detectable ID.

Preferably, the image analysis techniques comprise an AR marker tracking algorithm and a Simultaneous Localisation and Mapping (SLAM) algorithm for determining the spatial locations of the markers and of the camera in each of the images; the image analysis techniques comprising an algorithm based on epipolar geometry, for determining the spatial position of at least two prominent points of said one or more objects. Using the AR marker tracking algorithm, specific explicit measuring points can be unequivocally provided in the reconstructed objects.

More preferably, the image analysis techniques comprise a Simultaneous Localisation and Mapping (SLAM) or Structure from Motion (SfM) algorithm for determining the position of the camera and the spatial locations of the detected recognizable points during the recording of each of the images; and, in addition to that, an AR marker tracking algorithm, by means of which specific measuring points in the reconstructed scene can be unequivocally provided for determining the spatial position of at least two prominent points of said one or more objects.

The SfM technique and the SLAM technique are techniques that are known per se. The Internet-published article "Structure & Motion" by Kai Zhou (Matr. No. 0727794) describes and compares the SfM technique and the SLAM technique as well as two alternative methods of obtaining spatial information about an object. According to the aforesaid aspect of the invention, the SLAM technique is used for determining the camera position as well as the 3-D locations of the detected uniquely-identifiable point from the camera images. In the present invention, said set of points preferably comprises both the detected corner points of the markers and the prominent elements ("salient features" or "natural features") that are present in the vicinity.

Preferably, the method is used for extracting the aforesaid information for use in one of the following applications: making a stair lift or handrail; installing other architectural objects; recording situations in forensic examination; recording situations in archaeological examination; making measurements for technical installations in factories and at other locations.

The prominent points of said one or more objects can be marked by one or more of the markers, so that a high degree of measuring accuracy can be achieved and a set of clearly recognizable points are measured. Preferably, markers are used whose location as well as orientation can be determined, so that the point to be measured can be located outside the centre of the marker or outside the area of the marker. Depending on the contrast and the presence of recognizable patterns in the object, prominent points can also be determined by image recognition software.

The programme is preferably designed for storing at least part of the information, preferably the coordinates of the aforesaid spatial position of said one or more objects, in the digital memory.

According to one aspect of the invention, the programme is preferably designed for calculating an indication as to the achieved (statistical) accuracy of the extracted information about said one or more objects in real time and communicating said information via the output means, which indication may be an acoustic and/or visual signal. In this way it is ensured that sufficient images have been made for obtaining an accurate determination of the required information.

In a preferred embodiment, the method is used for making a stair lift comprising a guide which is installed at the staircase and along which a frame on which a person can be seated can move, wherein markers are placed on or near the staircase, and wherein the information about said one or more objects comprises at least the spatial position of the markers. The programme is preferably designed for calculating dimensions of parts of the guide of the stair lift. In this way the shape and the dimensions of parts of the guide, for example a rail, can be calculated in real time and possibly be visually presented as output to the user.

The device preferably comprises a display screen, and in a preferred embodiment the indication about the obtained (statistical) accuracy comprises an object generated by the central processing unit, for example consisting of a projection of points, lines and/or planes, such as, for example, the staircase or the aforesaid guide rail, which is to an increasingly stable degree shown overlapping the current image from the camera, for example of the staircase, on the display screen. In this way the user, moving along the object or objects with the device and recording images, will see the generated object, for example the reconstructed staircase, with possibly a rail already projected into the image, appear on the screen in augmented reality, which generated object may first be displayed incompletely yet and/or change its position, but as soon as sufficient images are available, the object will be displayed completely and at a stable position.

The SLAM algorithm may for example be carried out by one of the following available or comparable tools: PTAMM from the Active Vision Group of Oxford University, United Kingdom, or the iPad 2-based SLAM implementation from 13th Lab, Sweden.

The AR marker tracking algorithm may for example be carried out by one of the following available or comparable tools: Vuforia from Qualcomm; ARToolkit from ARToolworks; OpenCV (Open Source Computer Vision).

The device is preferably a tablet computer or a smartphone, which are commercially available. The device preferably comprises an acceleration sensor and/or gyroscope, which is connected to the central processing unit, the programme being designed to determine, based on information from the acceleration sensor and/or gyroscope, whether the camera is at least substantially stationary in the space, and to record an image from the camera in the sequence of images at that moment. In this way sharp images can automatically be recorded.

The invention also relates to the aforesaid computer programme, whether or not on a computer-readable carrier, for the extraction of information about one or more spatial objects by a person.

The invention will now be explained in more detail with reference to an embodiment shown in the figures, in which.

Figure 1:
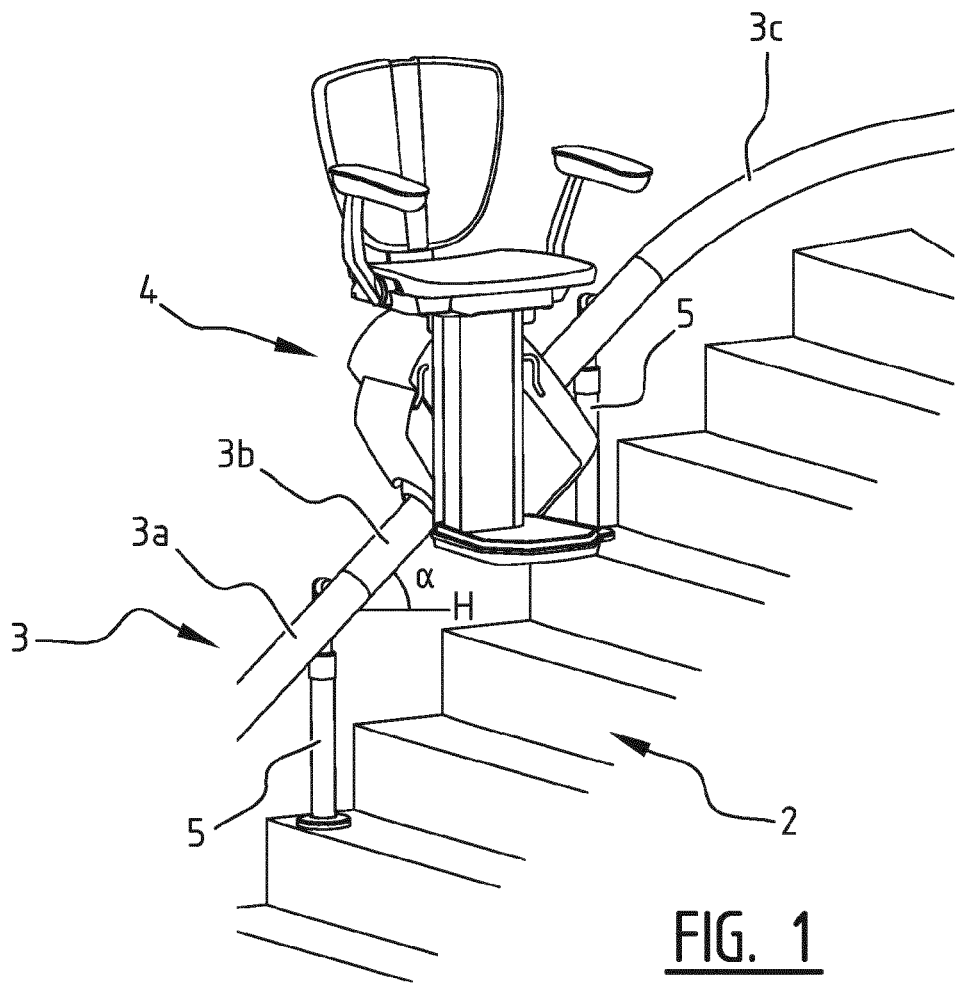
FIG. 1 is a perspective view of a staircase with a stair lift.

FIG. 1 shows a stair lift installation 1, which comprises a rail 3 mounted along a staircase 2 comprising bends, which rail includes an angle α with the horizontal H, and a device 4 for transporting a load between different levels, i.e. a stair lift in this case, which is movable along the rail 3. Such a stair lift is described in more detail in EP 2 216 284 A1.

The rail 3 is supported by a number of posts 5 provided along the staircase 2. The rail 3 is provided with a rack, which the motor of the movable device 4 can engage. The rail 3 consists of a number of rail parts 3a, 3b, 3c of different length and curvature.

To form the stair lift, markers are provided on the staircase at a number of locations (for example on every step).

Figure 2:
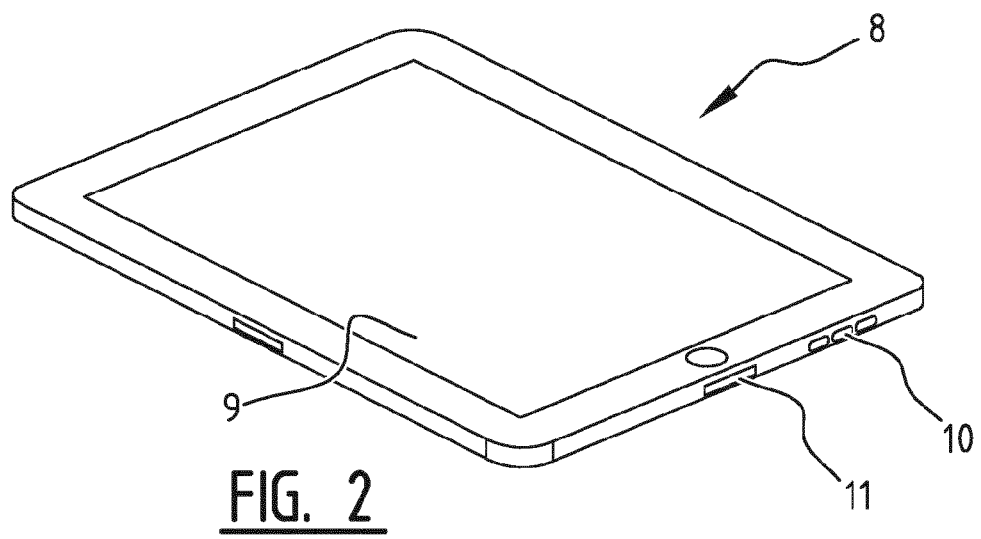
FIG. 2 is a perspective view of a tablet computer, by means of which the method according to the invention can be carried out.

Then a device as shown in FIG. 2, a tablet computer 8 provided with a camera, on which a computer programme designed for making and processing camera images in real time runs, is moved along the staircase provided with the markers. At regular intervals, the tablet computer 8 is held still by the user. The sensors in the tablet computer 8 detect when the tablet computer is stationary, and the computer programme is designed to make a recording at that moment.

In this specific application, the computer programme is designed to calculate the position of the posts 5 and the dimensions of the rail parts 3a, 3b, 3c etc in real time on the basis of the photos made. The computer programme may furthermore be designed to start projecting the reconstructed staircase with the posts 5 and the rail 3 in real time on the screen 9 of the tablet computer, in the image being perceived by the camera at that moment, as soon as said calculation produces a result. In this way the entire staircase with the stair lift guide will appear on the screen through augmented reality after some time. The projected rail parts 3a, 3b, 3c may initially be incomplete yet, or their position may change. The more photos are taken, the more stable and complete the projected image will be, so that the user obtains feedback regarding the progress of the measurement. Said feedback can also be given in different ways by means of indicators. If the precision of the measurement is sufficient, an acoustic signal will moreover sound from the loudspeaker 10 of the tablet computer 8. At that moment also the shapes and dimensions of the rail parts are stored in the memory of the tablet computer 8. Such a measurement can be completed in about 60 seconds. The data regarding the shapes and dimensions of the rail parts 3a, 3b, 3c and the required posts 5 can be read via a data port 11, or be transmitted via a wireless connection for further processing.

The computer programme uses a combination of a Simultaneous Localization and Mapping (SLAM) algorithm and an AR tracking algorithm for determining the position of the camera at the time of taking each of the photos as well as the 3-D location of the detected recognisable points. Said recognisable points preferably consist of two sets: the so-called natural features and the corner point of the AR markers. The natural features are uniquely identified by their so-called feature vector, and are given successive IDs, on the basis of the sequence of detection. The marker corner points are identified on the basis of the marker's own ID and the ID of the corner point. For example: top left is 0, top right is 1, bottom right is 2, bottom left is 3.

A recorded camera image is preferably analysed twice, therefore: once for extracting the IDs and the corner points of the AR markers, and preferably a second time for detecting/tracking the Natural Features.

The special feature of this method is the fact that AR marker tracking is combined with SLAM tracking in real time, as a result of which the advantages of both become available:

Since the AR markers can definitely be uniquely identified, a clear 3-D drawing of the situation is obtained in the calculated result (if only SLAM tracking on the basis of natural features is used, only a difficult-to-interpret cloud of points will be obtained).

Since the 3-D location of the detected points is calculated with a high degree of precision by SLAM tracking, also the location of the AR marker can be calculated very precisely. This in contrast to regular AR tracking, where the location of the markers is determined in the coordinate system of the camera (i.e. not globally) and with a relatively low degree of precision, in particular seen in the depth direction from the camera.

The computer programme is also designed for analysing the data in real-time using (statistical) techniques. Image analysis takes place in real time, in an iterative process, just as long until the required (statistical) accuracy is obtained, whereupon an acoustic or visual signal is delivered.

In this way a 3-D image of the staircase 2 and the vicinity thereof, provided with generated points, lines and planes can be displayed on the screen 9. Said points, lines and planes can in part be automatically generated, for example for forming the rail 3, in that the programme recognizes the fact that two markers belong together and must form a line. Other points, lines and planes can be generated interactively by the user, for example by selecting two points in the image between which a distance must be determined, or by designating three points for determining an angle, etc.

Figure 3:
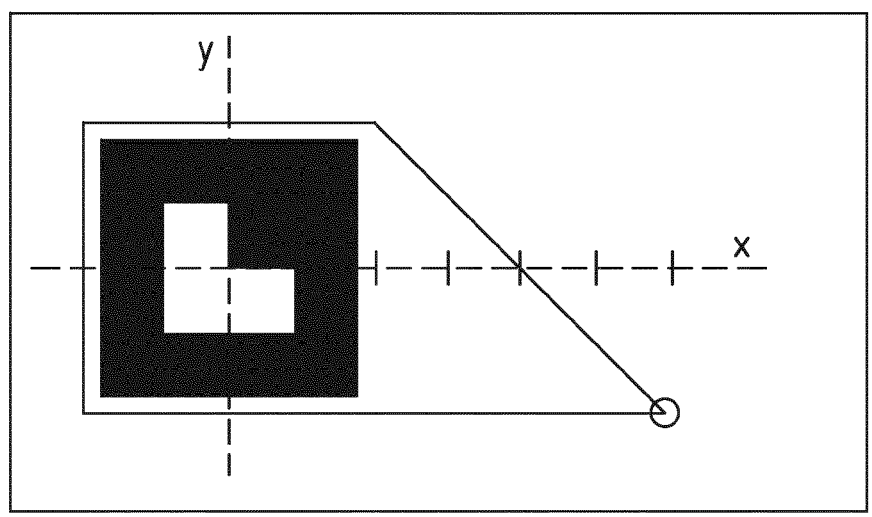
FIG. 3 is a top plan view of an AR marker that can be used in the method according to the invention.

An example of an AR marker as a measuring point is shown in FIG. 3. The coordinate of the measuring point, which can be indicated by the point of the marker, can generally be represented as (x, y, z), in this case as (6, −2, 0).

Figure 4:
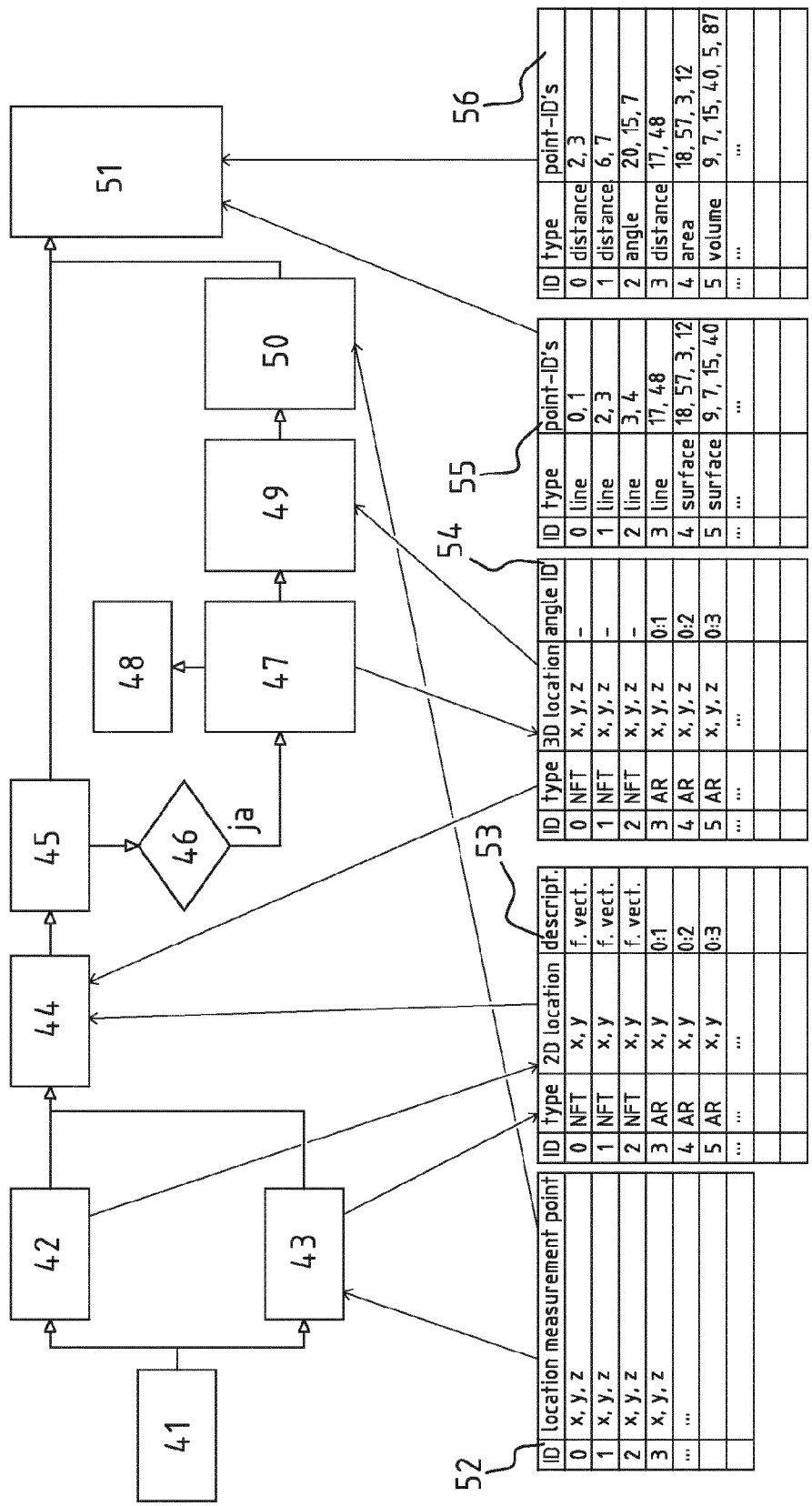
FIG. 4 is flow diagram of an algorithm that can be used in the method according to the invention.

An example of the steps in the algorithm as shown in FIG. 4:

Step 1 (41) Receive camera image from sensor;

Step 2a (42) Detect or track natural features in the camera image and store 2-D coordinates in the table (53);

Step 2b (43) Detect AR markers, read the relative 3-D coordinates from the table (52) and check the validity of the AR markers, and store the 2-D coordinates of the four corner points of the AR markers in the table (53), the descriptor being a combination of the marker ID and the identification of the corner point;

Step 3 (44) Perform SLAM analysis on the data from the table (53) of the detections of step 2a and step 2b and the table (54) of step 4a (47);

Step 4 (45) Update current location and orientation of the camera (tracking);

(46) If the camera position is sufficiently different;

Step 4a (47) Update 3-D reconstruction with new camera, points, refine existing points (mapping), this results in 3-D locations for the natural features in the table (54), and

(48) Update measuring quality of the detected AR markers from the current image;

Step 4b (49) Calculate coordinate systems of AR markers on the basis of precise 3-D locations of the corner points of the AR markers from the table (54);

Step 4c (50) Calculate locations of measuring points on the basis of coordinate systems of the marker plus relative location of measuring point in said system from the table (52);

Step 5 (51) Render real-time augmented reality view of reality plus geometric information and measuring information on the basis of the data are from step 3 and, if the camera position of step 4 has changed, also the data from step 4c—use can be made in that case of data from a table (55) comprising lines and planes, for example, and of data from a table (56) comprising, for example, distances, angles, surfaces and volumes present between measuring points that have been designated by the user by means of a user interface, or which are automatically provided between the measuring points by the processor on the basis of, for example, predefined groups of AR markers; Go to step 1 (41).

Although the invention has been explained in the foregoing on the basis of an exemplary embodiment in the foregoing, it will be understood that there are many possible applications of the present invention in which the location and/or orientation of objects within a space must be determined, for example in the field of installation technology, forensic examination, archaeology, landscape architecture, underwater measurements, renovation, construction, interior design, laying floors, road setting (zebra crossings, railway crossings, traffic lights) and the like.

The invention claimed is:

1. A method for the extraction of information about a staircase and for making a stair handrail or a stair lift comprising a guide which is installed at the staircase and along which a frame on which a person can be seated can move, wherein the method comprises:
    placing a plurality of markers on or near the staircase;
    moving a device along the staircase with the markers, wherein the device comprises:
        a central processing unit which is loaded with a computer programme;
        a digital memory which is connected to the central processing unit;
        a camera which is capable of recording a sequence of images; and
        output means which are connected to the central processing unit, and
    recording a sequence of images of said staircase with said markers with the camera;
    analyzing the sequence of images using image analysis techniques in real time while the device is being moved along the staircase;
    extracting information about said staircase comprising at least information about a spatial position of the plurality of markers in real time while the device is being moved along the staircase;
    calculating an indication as to then realized accuracy of the extracted information about a spatial position of the plurality of markers in real time;
    communicating said indication in real time via the output means in real time while the device is being moved along the staircase; and
    calculating dimensions of a plurality of parts of the stair handrail or of the guide of the stair lift using the extracted spatial position of the plurality of the markers.

2. A method according to claim 1, wherein said markers are placed on or near said staircase before a sequence of images is recorded by means of the device, which markers have a shape such that they can take up a detectable spatial orientation in the images, and wherein the computer programme determines the spatial position and orientation of the markers on the basis of the markers detected in the images and/or of prominent elements detected in the images, and uses the information of the thus determined position and orientation of the markers during the recording of each of the images upon extracting the aforesaid information about said staircase.

3. A method according to claim 1, wherein the image analysis techniques comprise an AR marker tracking algorithm and a Simultaneous Localisation and Mapping (SLAM) algorithm for determining the spatial locations of the markers and of the camera during the recording of each of the images; and wherein the image analysis techniques comprise an algorithm based on epipolar geometry, for determining the spatial position of at least two prominent points of said one or more objects, wherein the positions of the camera during the recording of each of the images as determined by the SLAM algorithm are also used as input of the algorithm.

4. A method according to claim 1, wherein the programme stores at least part of the information in the digital memory.

5. A method according to claim 1, wherein the programme stores coordinates of the aforesaid spatial position of said staircase in the digital memory.

6. A method according to claim 1, wherein the indication is an acoustic and/or visual signal.

7. A method according to claim 1, wherein the device further comprises a display screen, and wherein the indication about the obtained realized accuracy comprises an object generated by the central processing unit, said object being in the form of a hand rail or a guide rail for a stair lift, which is to an increasingly stable degree shown overlapping a current image from the camera of the staircase, on the display screen.

8. A method according to claim 3, wherein the SLAM algorithm is carried out by one of the following available or comparable tools:

parallel tracking and multiple mapping (PTAMM) from the Active Vision Group of Oxford University, United Kingdom; or the SLAM implementation from 13th Lab, Sweden.

9. A method according to claim 3, wherein the AR marker tracking algorithm is carried out by the following or comparable tool:

OpenCV (Open Source Computer Vision).

10. A method according to claim 1, wherein said device is a tablet computer or a smartphone.

11. A method according to claim 1, wherein the device comprises an acceleration sensor and/or gyroscope, which is connected to the central processing unit, and wherein the programme determines, based on information from the acceleration sensor and/or gyroscope, whether the camera is stationary in the space, and records an image from the camera in the sequence of images at that moment.

* * * * *